United States Patent
Tran et al.

[19]

[11] Patent Number: 6,154,646
[45] Date of Patent: Nov. 28, 2000

[54] SYSTEM AND METHOD FOR REAL-TIME INTERACTIVE SELECTION OF CALL TREATMENT IN A RADIO TELECOMMUNICATIONS NETWORK

[75] Inventors: Hung Tran, Mount Royal; Wayne Tom, St-Laurent; Francois Leduc, Pincourt, all of Canada

[73] Assignee: Telefonaktiebolaget L M Ericsson, Stockholm, Sweden

[21] Appl. No.: 09/151,249

[22] Filed: Sep. 10, 1998

[51] Int. Cl.[7] .................................................. H05M 7/00
[52] U.S. Cl. ......................... 455/417; 455/414; 455/445
[58] Field of Search .................................... 455/414–416, 455/417, 445–566, 419, 466, 564; 379/210, 211, 218

[56] References Cited

U.S. PATENT DOCUMENTS

| | | | |
|---|---|---|---|
| 5,673,322 | 9/1997 | Pepe et al. | 380/49 |
| 5,675,741 | 10/1997 | Aggarwal et al. | 395/200.12 |
| 5,794,142 | 8/1998 | Vanttila et al. | 455/414 |
| 5,878,351 | 3/1999 | Alanara et al. | 455/466 |
| 5,926,769 | 7/1999 | Valimaa et al. | 455/564 |
| 5,950,130 | 9/1999 | Coursey | 455/432 |

FOREIGN PATENT DOCUMENTS

| | | |
|---|---|---|
| 0692901A2 | 6/1995 | European Pat. Off. |
| 0781020A2 | 6/1997 | European Pat. Off. |
| WO 96/09714 | 3/1996 | WIPO |
| WO 97/33421 | 9/1997 | WIPO |

*Primary Examiner*—Edward F. Urban
*Assistant Examiner*—Congvan Tran
*Attorney, Agent, or Firm*—Smith & Danamraj, P.C.

[57] ABSTRACT

A system and method for interactively selecting call treatment in real time for an incoming call in a radio telecommunications network. A modified mobile station includes a display, a browser application that presents call information regarding the incoming call and call-treatment options on a pop-up menu the display, a keypad for a user to select a call-treatment option, and a Client Access Function Teleservice (CATS) handler that packages the selected call-treatment option in an IS-136 R-DATA message and sends the R-DATA message to a modified mobile switching center (MSC). The MSC determines that the R-DATA message is a CATS message from the value of the Higher Layer Protocol Identifier (HLPI) in the R-DATA message, and sends the call-treatment option to a modified service node in a short message service (SMS) message. A server in the service node receives the SMS message from the MSC, extracts the selected call-treatment option, and translates the call-treatment option into service scripts understood by the service node.

17 Claims, 3 Drawing Sheets

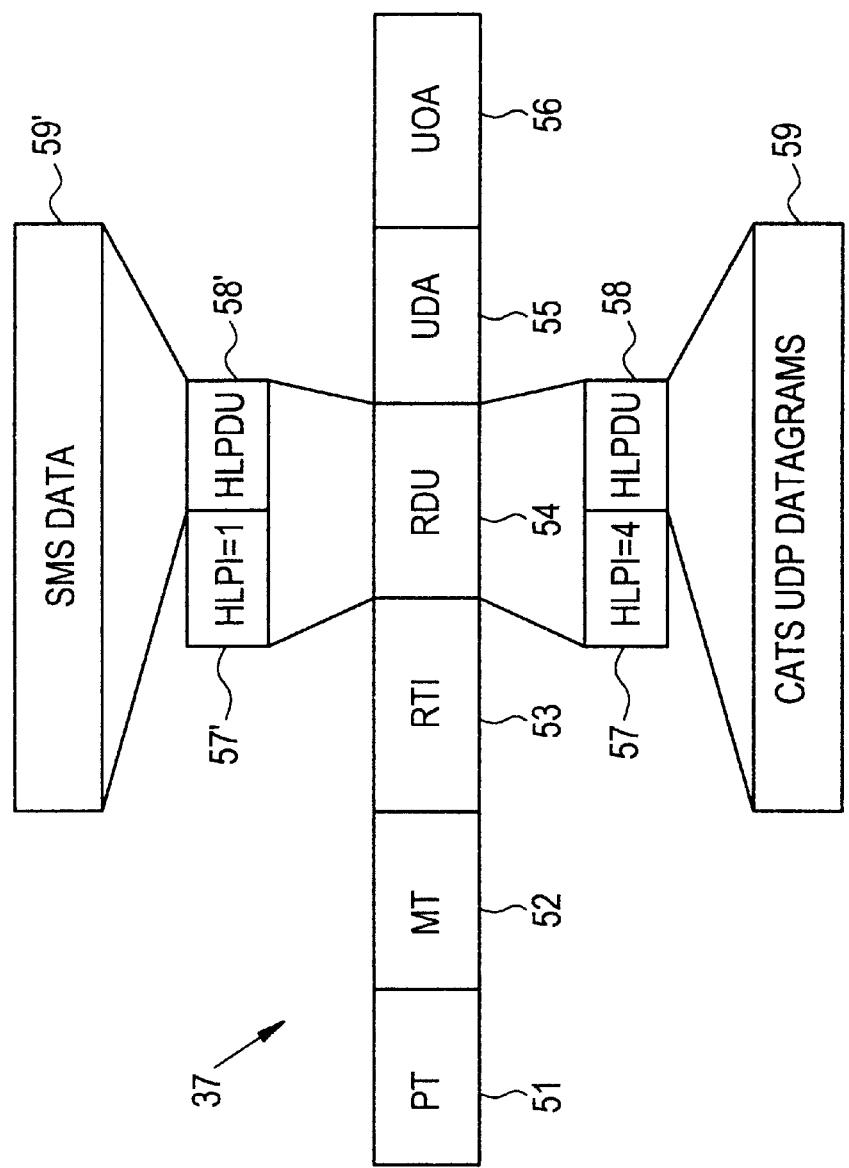

SYSTEM AND METHOD FOR REAL-TIME INTERACTIVE SELECTION OF CALL TREATMENT IN A RADIO TELECOMMUNICATIONS NETWORK

BACKGROUND OF THE INVENTION

1. Technical Field of the Invention

This invention relates to radio telecommunications networks and, more particularly, to a system and method of enabling the user of a mobile station to interactively select the call treatment for an incoming call in real time.

2. Description of Related Art

In a radio telecommunications network, the term "call treatment" refers to how the network directs a particular call. For example, call treatment for an incoming call to a mobile station (MS) may include such options as connecting the call to the MS, forwarding all calls to a transfer number, forwarding calls to a transfer number when the MS is busy, forwarding the call to voice mail, rejecting calls from specified calling parties, etc. In existing radio telecommunication networks, call treatment is determined by which features are activated or deactivated in the subscriber's home location register (HLR), and whether the network provides enhanced subscriber services through the implementation of a Service Control Point (SCP) or an integrated HLR/SCP service node. In networks providing such enhanced services, a change in call treatment requires the activation or deactivation of one or more features in the HLR. The change cannot be performed in real time in response to an incoming call.

There are no known prior art teachings of a solution to the aforementioned deficiency and shortcoming. In order to overcome the disadvantage of existing solutions, it would be advantageous to have a system and method of enabling the user of a mobile station to interactively select the call treatment for an incoming call in real time. The present invention provides such a system and method.

SUMMARY OF THE INVENTION

In one aspect, the present invention is a system for interactively selecting call treatment in real time for an incoming call in a radio telecommunications network. The system comprises a modified mobile station, a modified mobile switching center (MSC), and a modified service node such as a home location register/service control point (HLR/SCP). The modified mobile station includes a display, a browser application that presents call information regarding the incoming call and call-treatment options on the display, means for a user to select a call-treatment option, and means for packaging the selected call-treatment option in a R-DATA message and sending the R-DATA message to the MSC, the R-DATA message including an indication directing the MSC to send the selected call-treatment option to the service node.

The modified MSC includes means for selectively directing a short message service (SMS) message with the call-treatment option to the service node. The modified service node includes a server that receives the SMS message from the MSC. The server includes means for extracting the selected call-treatment option from the SMS message, and means for translating the selected call-treatment option into service scripts understood by the service node.

In another aspect, the present invention is a method in a radio telecommunications network of providing real-time call-treatment instructions from a user to the network for handling an incoming call to the user's mobile station (MS). The method includes the steps of sending call information regarding the incoming call from a mobile switching center (MSC) to the MS, activating a browser in the MS to display a pop-up menu showing the user the call information and call-treatment options, and registering a call-treatment option selected by the user. This is followed by sending the user's selected call-treatment option from the MS to the MSC, sending the user's selected call-treatment option from the MSC to a network service node, and routing the incoming call in accordance with the user's selected call-treatment option. The selected call-treatment option may be sent from the MS to the MSC in an IS-136 R-DATA message. The selected call-treatment option may be sent from the MSC to the service node in a SMS message. The MSC directs the SMS to the service node when the R-DATA message includes a Higher Layer Protocol Identifier (HLPI) which indicates that the message includes a call-treatment option.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 3 is an illustration of the mapping of Client Access Function Teleservice (CATS) data in an IS-136 R-DATA message in accordance with the teachings of the present invention.

DETAILED DESCRIPTION OF EMBODIMENTS

Figure 1:
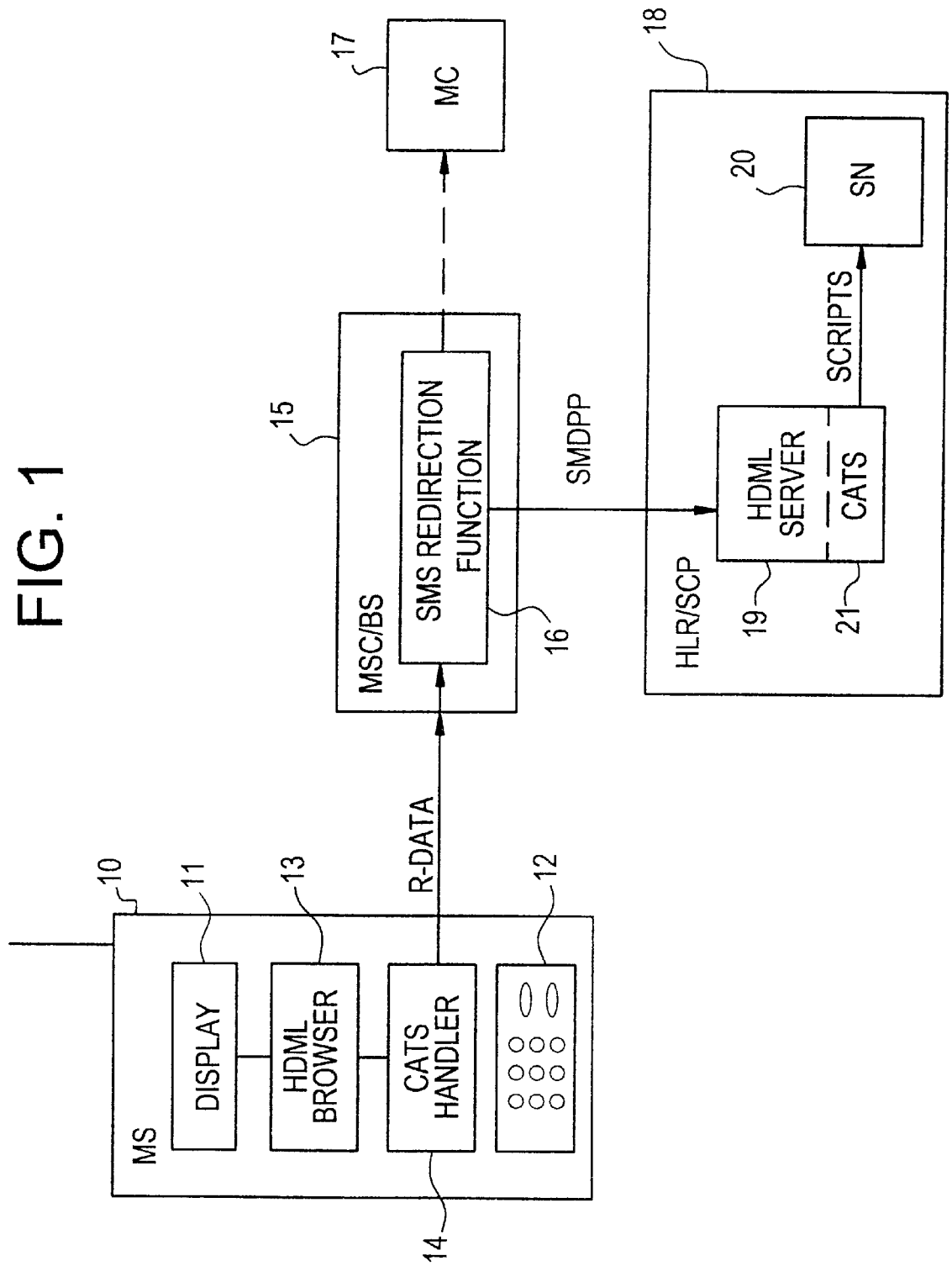
FIG. 1 is a simplified block diagram of the system of the present invention.

The present invention implements a new teleservice known as the Client Access Function Teleservice (CATS). The present invention modifies existing mobile stations (MSs), mobile switching centers (MSCs), and service nodes to enable the user of a MS to input desired call treatment commands, and to transport those commands in real time to a service node such as a HLR/SCP. The user may choose to accept the call, or may select or enter a transfer number. The MS may be preprogrammed with transfer numbers, which pop up for selection by the user. While the user decides what call treatment he prefers, an announcement may be played to inform the calling party of a slight delay in connecting the call so that the calling party does not prematurely abandon the call.

The invention implements a Web-type browser in the MS and a routine is set up so that an incoming call invokes an application for the browser. The browser allows the user to interactively accept calls or give commands in real time to the service node regarding how to handle the call. An incoming call is presented to the user on the MS display along with call-treatment options in a format according to the installed browser interface. The user then selects a call-treatment option by choosing, for example, to accept the call, reject the call, or redirect the call to another number or to voice mail. The MS browser utilizes the Handheld Device Markup Language (HDML) protocol. HDML is similar to the HTML protocol as used on the Internet, but is for handheld devices. Thus, the browser is essentially a high level application to handle the interface with the user.

Teleservices are services that build upon the IS-136 R-DATA message. Each teleservice is identified by a unique value in the Higher Layer Protocol Identifier (HLPI) field within the R-DATA Unit information element included in the R-DATA message. Two such teleservices defined today are the Short Message Service Cellular Messaging Teleservice (SMS CMT) and the Over-the-Air Activation Teleservice (OATS). The SMS CMT supports short message services, and the OATS supports activation of certain services over the air interface.

In the preferred embodiment of the present invention, the user's call-treatment commands are delivered over the air interface to the MSC using SMS messages sent as IS-136 R-DATA messages with encapsulated User Datagram Protocol (UDP) datagrams. SMS transport is utilized to relay the commands because it is real time, as opposed to relying on the Internet Protocol (IP) which is not real time. Within the IS-136 R-DATA message format, the HLPI is used to define the new CATS teleservice. The HLPI becomes a marker that identifies that the R-DATA message is a CATS message which includes call-treatment instructions.

In prior art radio telecommunications networks, the SMS CMT teleservice directed a MS's SMS messages from the MSC to the SMS Message Center (MC). The present invention modifies the MSC to recognize the CATS HLPI marker, and to redirect SMS messages that are carrying CATS data to the service node rather than the MC. The service node may be a Service Control Point (SCP), a Home Location Register (HLR), or an integrated HLR/SCP node which provides supplementary services. The MSC and base station (MSC/BS) performs the interworking from the IS-136 R-DATA message on the air interface to the ANSI-41 SMS Delivery Point-to-Point (SMDPP) message. The CATS messages are sent over the ANSI-41 network in the SMS Bearer Data portion of the SMDPP message.

A HDML server is installed in the service node to unwrap and translate the datagrams. A CATS function in the server unwraps the encapsulated UDP datagrams, and translates the HDML protocol into service script instructions understood by the service node. The service node then completes the call-treatment instructions normally.

FIG. 1 is a simplified block diagram of the system of the present invention. A MS 10 includes all the functionality and features of a normal MS including a display 11 and a keypad 12 for user interaction. A HDML browser 13 is added to the MS to present a Web-like browser interface to the user. The browser presents call information regarding the incoming call and call-treatment options on the display. A CATS handler 14 packages the user's selected call-treatment option in UDP datagrams and sends R-DATA messages to the MSC/BS 15. The MSC/BS includes all of the fimctionality of a normal MSC/BS with the addition of a SMS redirection function 16 that serves to direct normal SMS messages to a MC 17 and to direct CATS SMS messages to a HLR/SCP 18. The HLR/SCP includes a HDML server 19 and a service node (SN) portion 20. The HDML server includes the CATS function 21 which unwraps encapsulated UDP datagrams and translates the HDML protocol to service scripts. The SN portion performs the normal functions of a service node in retrieving and activating enhanced subscriber services.

Figure 2:
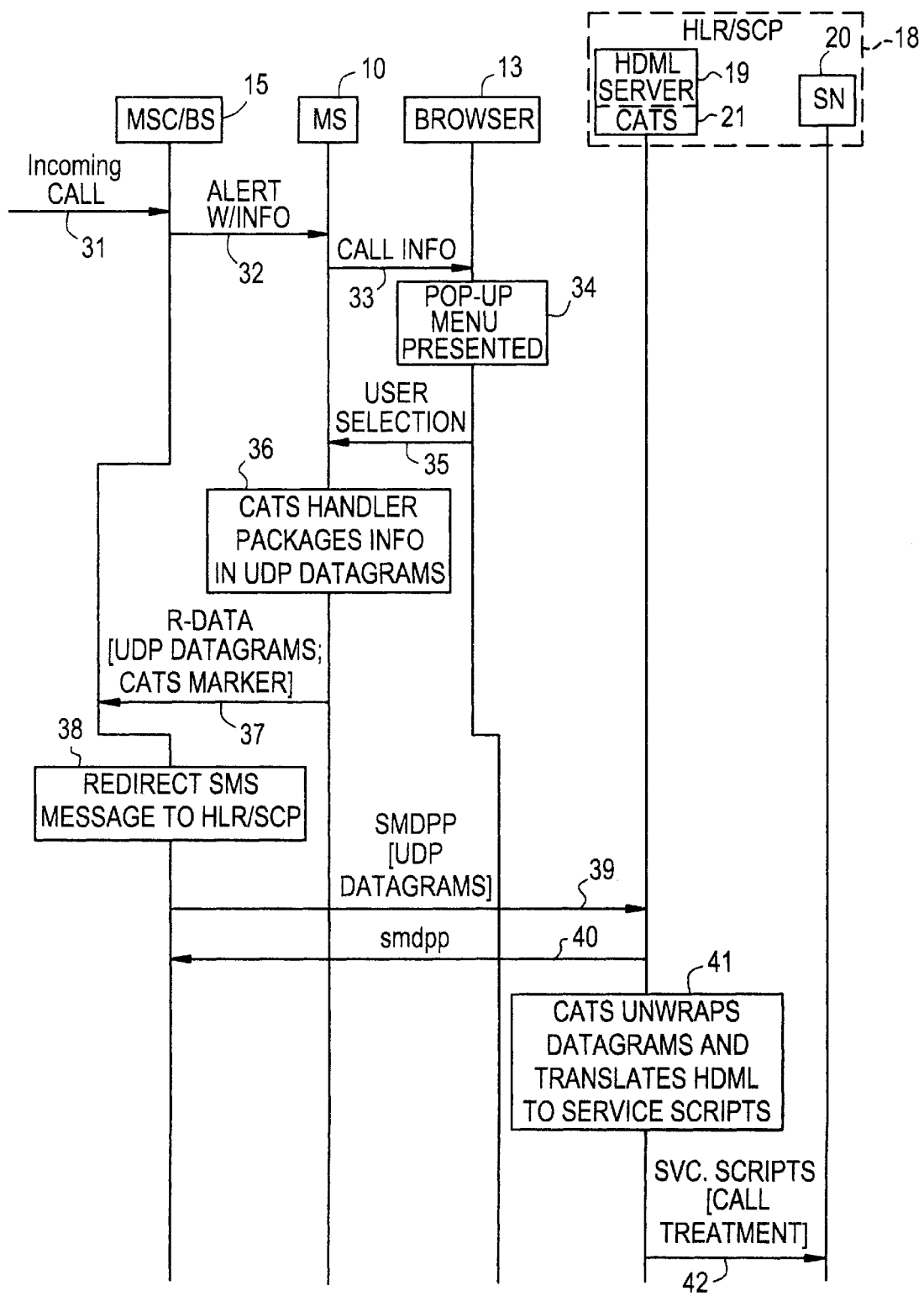
FIG. 2 is a message flow diagram illustrating the steps of the method of the present invention.

FIG. 2 is a message flow diagram illustrating the steps of the method of the present invention. When an incoming call 31 is received at the MSC/BS 15, and the MS 10 has been successfully paged, the MSC/BS sends information regarding the calling party to the MS in an Alert with Information message 32. The call information 33 is provided to the HDML browser 13 which presents the information and call-treatment options at 34 to the user in a pop-up browser menu on the MS display 11. The user reviews the call information and selects an option for call treatment on the browser menu. The user selection 35 is forwarded by the browser to the MS. The CATS handler 14 in the MS then packages the use's selected call-treatment option in UDP datagrams at 36, and sends a R-DATA message 37 to the MSC/BS 15. The R-DATA message includes the datagrams and a CATS HLPI value which identifies to the MSC/BS that the message is a CATS message.

At 38, the MSC/BS 15 then redirects its SMS function to address the CATS message to the HLR/SCP 18 rather than the MC 17. The MSC/BS then sends a SMDPP Invoke message 39 to the HLR/SCP, and includes the CATS message as UDP datagrams. The HLRISCP sends a SMDPP Return Result message 40 to the MSC/BS, and then utilizes its CATS function 21 in the HDML server 19 to unwrap the encapsulated UDP datagrams and translate the HDML protocol to service scripts at 41. The service scripts, which include the user's selected call treatment, are then sent at 42 to the service node portion 20 where they direct the service node portion to perform the selected call treatment.

FIG. 3 is an illustration of the mapping of CATS data in the IS-136 R-DATA message 37 in accordance with the teachings of the present invention. Of course, any equivalent of the R-DATA message may be used, and the IS-136 R-DATA message is being used here for exemplary purposes only. The R-DATA message 37 includes the following fields: a protocol discriminator (PT) 51, a message type (MT) 52, a R-Transaction Identifier (RTI) 53, a R-Data Unit (RDU) 54, a user destination address (UDA) 55, and a user origination address (UOA) 56.

As is known in the art, the RDU 54 is used to send SMS messages. The RDU is divided into a Higher Layer Protocol Identifier (HLPI) 57 and a Higher Layer Protocol Data Unit (HLPDU) 58. FIG. 3 shows in the top portion of the figure that for SMS messages, the HLPI 57' is set to a value of 1. The HLPI is then appended to the HLPDU 58' which contains the SMS data 59'. In the IS-136 standard, a HLPI value of 0 indicates that the message is network specific; a value of 2 identifies the Cellular Paging Teleservice (CPT); a value of 3 identifies the Over-the-Air Activation Teleservice (OATS); and values of 4-255 are reserved for future use.

One embodiment of the present invention, shown in the lower portion of FIG. 3, makes use of a reserved HLPI value, for example 4, to indicate to the MSC/BS that the message is a CATS message. Thus, the HLPI 57 is the CATS marker. The HLPI 57 is appended to the HLPDU 58 in which the CATS UDP datagrams 59 are encapsulated.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for interactively selecting call treatment in real time for an incoming call in a radio telecommunications network, said system comprising:
   a mobile station that includes:
      a display;
      a browser application that presents call information regarding the incoming call and call-treatment options on the display:
      means for a user to select a call-treatment option for the incoming call; and means for packaging the selected call-treatment option for the incoming call in an IS-136 R-DATA message and sending the R-DATA message to a mobile switching center (MSC), said R-DATA message including an indication directing the MSC to send the selected call-treatment option to a service node;

a mobile switching center (MSC) that includes means for selectively directing a short message service (SMS) message with the call-treatment option for the incoming call to the service node; and a server in the service node that receives the SMS message from the MSC, said server comprising:

means for extracting the selected call-treatment option for the incoming call from the SMS message;

means for translating the selected call-treatment option for the incoming call into service scripts understood by the service node; and means for performing the selected call-treatment option for the incoming call.

2. The system for interactively selecting call treatment in real time of claim 1 wherein the indication directing the MSC to send the selected call-treatment option to a service node is a value assigned to a Higher Layer Protocol Identifier (HLPI) included in the R-DATA message.

3. The system for interactively selecting call treatment in real time of claim 2 wherein the means for packaging the selected call-treatment option in a R-DATA message and sending the R-DATA message to a MSC is a Client Access Function Teleservice (CATS) handler which places the selected call-treatment option in User Datagram Protocol (UDP) datagrams and encapsulates the datagrams in the Higher Layer Protocol Data Unit (HLPDU) included in the R-DATA message.

4. The system for interactively selecting call treatment in real time of claim 3 wherein the means for selectively directing a SMS message with the call-treatment option to the service node includes:

means for determining whether the HLPI value indicates that the SMS message is a CATS message; and means for redirecting the SMS message to the service node upon determining that the HLPI value indicates that the SMS message is a CATS message.

5. The system for interactively selecting call treatment in real time of claim 4 wherein the browser application utilizes Handheld Device Markup Language (HDML).

6. The system for interactively selecting call treatment in real time of claim 5 wherein the means in the server for extracting the selected call-treatment option from the SMS message includes means for unwrapping the encapsulated UDP datagrams in the SMS message.

7. The system for interactively selecting call treatment in real time of claim 6 wherein the means for translating the selected call-treatment option into service scripts includes means for translating from HDML to service scripts understood by the service node.

8. In a radio telecommunications network, a method of providing real-time call-treatment instructions from a user to the network for handling an incoming call to the user's mobile station (MS), said method comprising the steps of:

sending call information regarding the incoming call from a mobile switching center (MSC) to the MS;

activating a browser in the MS to display a pop-up menu showing the user the call information and call-treatment options for the incoming call;

registering a call-treatment option selected by the user for the incoming call;

sending the user's selected call-treatment option for the incoming call from the MS to the MSC;

sending the user's selected call-treatment option for the incoming call from the MSC to a network service node; and routing the incoming call in accordance with the user's selected call-treatment option for the incoming call.

9. The method of providing real-time call-treatment instructions of claim 8 wherein the step of sending the user's selected call-treatment option from the MS to the MSC includes sending the call-treatment option in an IS-136 R-DATA message.

10. The method of providing real-time call-treatment instructions of claim 9 wherein the step of sending the call-treatment option in an IS-136 R-DATA message includes encapsulating the selected call-treatment option in a User Data Protocol (UDP) datagram in a Higher Layer Protocol Data Unit (HLPDU) in the R-DATA message.

11. The method of providing real-time call-treatment instructions of claim 10 wherein the step of sending the call-treatment option in an IS-136 R-DATA message includes assigning a value to a Higher Layer Protocol Identifier (HLPI) included in the R-DATA message, said HLPI value indicating that the R-DATA message includes the selected call-treatment option.

12. The method of providing real-time call-treatment instructions of claim 11 wherein the step of sending the user's selected call-treatment option from the MSC to a network service node includes sending the call-treatment option in a Short Message Service (SMS) message from the MSC to the service node.

13. The method of providing real-time call-treatment instructions of claim 12 wherein the step of sending the call-treatment option in a SMS message from the MSC to the service node includes:

determining whether the R-DATA message includes the call-treatment option; and redirecting the SMS message in the MSC to route the message to the service node upon determining that the R-DATA message includes the call-treatment option.

14. The method of providing real-time call-treatment instructions of claim 13 wherein the step of determining whether the R-DATA message includes the call-treatment option includes determining the value of the HLPI included in the R-DATA message.

15. The method of providing real-time call-treatment instructions of claim 14 further comprising, after the step of sending the user's selected call-treatment option from the MSC to a network service node, the steps of:

receiving the SMS message in a server in the service node;

unwrapping the UDP datagrams in the server;

translating the UDP datagrams in the server into service scripts understood by the service node.

16. The method of providing real-time call-treatment instructions of claim 8 further comprising playing an announcement informing a calling party of a slight delay in connecting the call.

17. A system for interactively selecting call treatment in real time for an incoming call in a radio telecommunications network, said system comprising:

a mobile station that includes:

a browser application that presents call information regarding the incoming call and call-treatment options for the incoming call to a user;

means for a user to select a call-treatment option for the incoming call; and means for sending the selected call-treatment option for the incoming call to a mobile switching center (MSC);

a function within the MSC for selectively directing a message with the call-treatment option for the incoming call to a service node; and a server within the service node that receives the message from the MSC and translates the selected call-treatment option for the incoming call into service scripts understood by the service node.

* * * * *

UNITED STATES PATENT AND TRADEMARK OFFICE
CERTIFICATE OF CORRECTION

PATENT NO. : 6,154,646
DATED : November 28, 2000
INVENTOR(S) : Tran et al.

It is certified that error appears in the above-identified patent and that said Letters Patent is hereby corrected as shown below:

Column 3,
Line 50 delete "fimctionality" and substitute -- functionality -- therefor.

Signed and Sealed this

Twenty-fifth Day of September, 2001

Attest:

NICHOLAS P. GODICI
Attesting Officer   Acting Director of the United States Patent and Trademark Office